United States Patent [19]

Hoffmann

[11] 4,165,769

[45] Aug. 28, 1979

[54] BATTERY FILLING SYSTEM

[76] Inventor: Gunter Hoffmann, Vogtskamp 6, 2000 Hamburg 65, Fed. Rep. of Germany

[21] Appl. No.: 805,733

[22] Filed: Jun. 13, 1977

[30] Foreign Application Priority Data

Jun. 21, 1976 [DE] Fed. Rep. of Germany ... 7619598[U]

[51] Int. Cl.² ............................................. B65B 3/26
[52] U.S. Cl. .................................. 141/198; 141/349; 141/352; 141/360
[58] Field of Search ............... 137/260, 261, 322, 433; 141/198, 237, 285, 291, 292, 295, 296, 301, 302, 309, 310, 346, 347, 351, 352, 360, 348, 349; 215/247, 310

[56] References Cited

U.S. PATENT DOCUMENTS

| 1,469,963 | 10/1923 | Sartakoff | 137/260 |
| 2,433,989 | 1/1948 | Hansen | 137/261 X |
| 2,436,291 | 3/1948 | Daniel | 215/247 X |
| 3,662,793 | 5/1972 | Calisher et al. | 141/349 X |
| 4,047,572 | 9/1977 | Stary et al. | 141/348 X |

Primary Examiner—Richard E. Aegerter
Assistant Examiner—Frederick R. Schmidt
Attorney, Agent, or Firm—Edward F. Levy

[57] ABSTRACT

The invention relates to a filling system for a secondary battery. A stopper is inserted in the battery and has a liquid channel passing through it, the passage being closable by means of an inlet valve controlled by the level of the liquid in the battery. The stopper cooperates with a filling nozzle which is connected to a storage container for the filling liquid. The nozzle is movable relatively to the stopper and may be inserted through a closable filling opening of the stopper. The nozzle is provided with an outlet opening associated with an outlet valve which cooperates with and is operated by an opening element carried by the stopper when the nozzle is inserted into the stopper.

20 Claims, 3 Drawing Figures

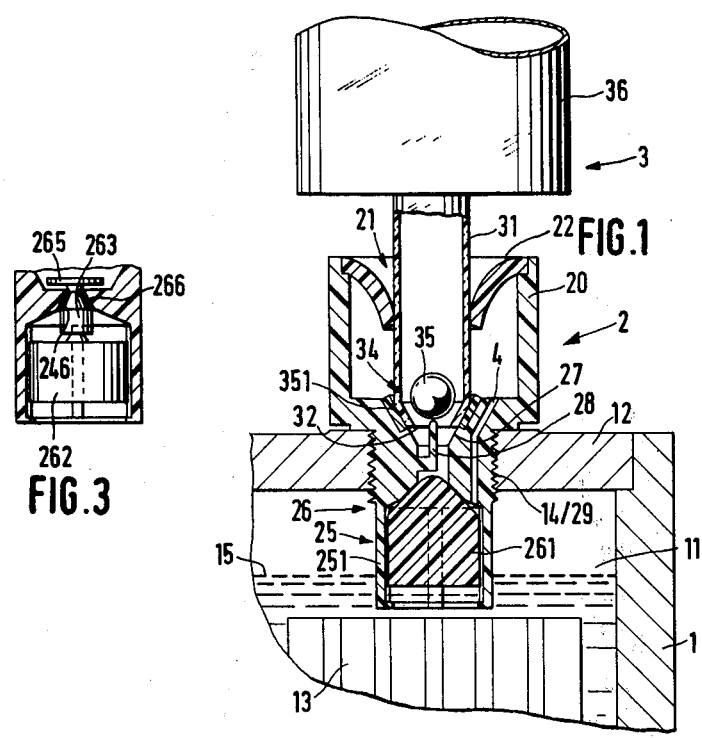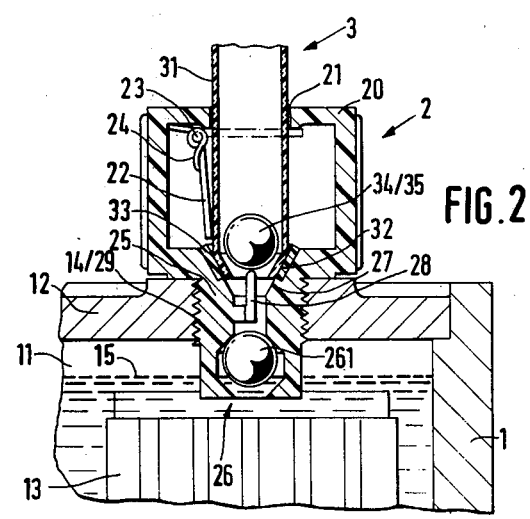

BATTERY FILLING SYSTEM

The invention refers to a system for the filling of secondary batteries, especially lead batteries. A stopper is inserted in the battery and has a liquid channel passing through it which can be closed by means of an inlet valve controlled by the level of liquid in the battery. A filling tube opens into a filling opening in the stopper and is connected to a storage container for the filling liquid.

For maintaining service readiness and achieving an acceptable working life it is necessary to check the liquid level in the acid cells regularly and to top it up with distilled water to keep it always above the top edge of the lead plates. However overfilling of an acid cells must be avoided too, since they otherwise may "boil over". In order to be able to perform the checking of the acid level and to top up with distilled water, known lead batteries are provided with filler stoppers which have a venting and topping-up labyrinth and are unscrewed for checking and topping up. In spite of the unscrewable filler connections, checking of the liquid level and topping up with distilled water are tiresome processes which, particularly in the case of the starter batteries of a private motor car, get forgotten or are neglected even in workshops. But the care of whole sets of batteries is very laborious, such as are to be encountered in, for example, electrically driven transport vehicles such as handcarts or forklift trucks. In the case of banks of lead batteries of that kind and of the arrangement or accommodation of them which is usually unfavourable to checking it is even with careful procedure unavoidable that individual acid cells are inadequately filled and others again overfilled. With underfilling the storage capacity and life is impaired and with overfilling water and acid residues lead to contamination and corrosion. Seen as a whole the care of batteries with the aid of unscrewable filler stoppers is a tiresome, time-wasting and uncertain process.

A filling system of the kind described initially is known (U.S. Pat. No. 1,469,963) in which the storage container, filling tube and stopper are connected solidly together. In this case a number of battery units are associated with one storage container, that is via a central pipe from which branch off the individual filling tubes. With this system filling of all the batteries can be carried out at the same time via a central stopcock, but filling of one individual battery unit independently of another is impossible. Because of the supply via a central pipe it cannot be avoided with certainty that different degrees of filling arise in the individual connected battery units and hence it can lead to irregularities in service.

In accordance with the invention, a stopper is arranged to be inserted in an opening at the top of a secondary battery and has a liquid channel which passes through the stopper and which is closable by means of an inlet valve arranged to be controlled in use by the level of liquid in the battery; the stopper also having a closable filling opening through which, in use a filling nozzle can be inserted into the liquid channel.

In use the stopper may be used in conjunction with a filling nozzle which is connected to a storage container for the filling liquid and which is movable with respect to and through the closable filling opening of the stopper, the nozzle being provided with an outlet opening associated with an outlet valve cooperable with and operable by an opening element carried by the battery when the nozzle is inserted into the stopper.

This system enables a simple checking and accurate adjustment of the liquid level.

The stopper no longer needs to be screwed out for checking and topping-up and a simple changeover of existing battery installations is possible. The system is vibration-proof and allows easy exchangeability. At the same time where necessary a topping-up reserve of distilled water may be provided and there follows automatically checking of the level of fill and an automatically working topping-up device. In order to be able to introduce the filling tube easily into the filling opening of the stopper, but at the same time to ensure its secure cut-off at the end of the filling, the opening in the stopper may be provided with a cover which is opened by insertion of the nozzle and closed upon withdrawal of the nozzle. A cover which can be forced inside the stopper has proved particularly advantageous, but it may alternatively consist, for example, of a rubber plate slit in a cross shape.

The stopper may be equipped on the side adjacent to the battery with a valve cage in which a float valve body of the inlet valve is guided. Such an arrangement is on the one hand simple structurally and on the other can be produced at favourable cost. By making the valve as a float, with correct adjustment of the acid level in the battery, precise closure of the valve occurs. In order to design the guidance and adjustment absolutely exactly in the critical positions the valve cage preferably reaches down to below the acid level in the battery.

Various possibilities exist for the structural design of the inlet valve. Thus the valve body may have the shape of a sealing cone with a float cylinder attached, so only a single valve body component, easy to produce, is obtained. But in many cases it may also be advantageous to make the valve body of two parts, in which case it then consists of a float body and a separate sealing body moved by it against the valve seat upon the acid level rising. In this case in order to guarantee a rapid response of the sealing body it may be provided above its sealing cone with a platelike attachment at the side of the valve opening remote from a valve seat with which the sealing body co-operates.

For reasons of structural simplicity, however, the valve body may also consist of a ball.

In order that both under mechanical and also manual introduction of the filling tube, secure and orderly seating of the tube in the stopper is guaranteed a tapered socket may be provided in the latter for coupling to the filling tube being introduced. In that case the tapered socket may be equipped with a flexible seal in order thus to provide secure automatic sealing with the sube.

In order to control the open and closing of the outlet opening from the filling tube automatically, the opening element may be provided in a hollow container part of the stopper in the form of a stud, finger or other element projecting towards the filling opening. In that case the opening element is advantageously arranged in the region of the tapered socket so that the outlet valve is opened only when the correct filling-position of the filling tube has been reached with certainty. In this way it is avoided that impurities which are in any way considerable can get inside the battery with the distilled water.

For reasons of production technique as well as for simple ease of handling, the filling tube may be movable together with the storage container. The two may form one unit, in which case the volume of the storage container preferably corresponds with the average amount of liquid consumed by one battery cell. In order to be able to establish the consumption of distilled water quickly the surface of the liquid in the storage container should be visible on the outside, which may be achieved perfectly well by a gauge glass but also by means of a transparent plastics wall of the storage container.

In order to facilitate changeover of lead batteries with conventional stoppers the stopper may be seated in the battery by screwing it in.

The filling system may be used for filling up a battery installation composed of a number of or, in certain cases, numberous battery units, in which case preferably in a solid raisable frame storage containers with filling tubes are provided which in number and spacing correspond with the number and spacing of the individual battery units. The individual storage containers in this frame when the filling tubes are lying outside the stoppers, that is, when the frame is raised, may be filled up centrally and thus all obtain the same amount of water. Upon lowering the frame each battery unit then accepts the amount of water actually needed until the required acid level regulated by the inlet valve is reached. After a certain time which is adequate for filling even where the need of water is highest, the frame is raised again. Now the amounts removed from the individual storage containers can be easily established and compared with one another overall, from which the possibility arises of forming an opinion upon the operability of the battery installation as a whole as well as of its individual elements. With fillings effected at regularly performed intervals increasing amounts consumed infer heavier discharge of the installation. But by this visual observation of the amount taken up it can be recognized quite particularly easily whether any individual battery units are defective or there is damage in the closure system.

The advantages achievable by the invention consist in the fact that without unscrewing a stopper a filling device may be introduced in a simple manner and topping-up performed without danger of contamination. The psychological pressure on maintenance personnel is also eliminated, of having to fulfil an uncongenial task. The consequence is considably more regular maintenance and hence a lengthening of the life of these expensive groups. But above all there follows from the invention a basically quicker performance of the filling process.

Some examples of battery systems according to the invention are illustrated diagrammatically in the accompanying drawings, in which:

FIG. 1 is: a partial section through one system;

FIG. 2 is: a corresponding partial section with various structural modifications; and, FIG. 3 shows: a further modified form of the inlet valve.

A battery 1 consists of a number, depending upon the level of voltage desired, of acid cells 11 only one of which is shown here for the sake of simplicity and in each of which is accommodated a set of lead plates 13. Each acid cell 11 is filled with sulphuric acid up to a level 15 of the liquid, lying above the top edge of the lead plates 13, which is determined by the capacity of the battery. Above each acid cell 11 or battery unit lies a top part 12 of the housing with a screw thread 14 which is closed by a stopper 2. The stopper 2 comprises a screw threaded connection 29 which fits in the screw thread aperture 14, with a hollow container 20 above and a valve cage 25 below. The hollow container 20 has at the top a filling opening 21 which is closed by a cover 22. In FIG. 1 this cover has the form of a rubber plate slit in a cross, whilst in accordance with FIG. 2 the cover 22 is provided as a rigid plate which can be swung down inwards about a pivot 23 and is kept in the closed position by the force of a spring 24. But instead of the inherently elastic or sprung covers 22 in accordance with FIGS. 1 and 2 any other suitable cover which advantageously returns automatically into its closed position may be made use of.

The valve cage 25, which in FIG. 1 is composed of a number of individual rodlike parts 251 extending downwards, whilst in the example as FIG. 2 it is formed more like an inlet connection, reaches into the acid cell 11 down to below the normal level 15 of the the liquid. A valve body 261 of an inlet valve 26 is guided in this valve cage 25. The valve 26 comprises besides the valve body 261 also a tapered valve-seat which in FIGS. 1 and 2 is not more closely designated but in FIG. 3 is indicated by 266. Whilst the valve body 261 in FIG. 1 consists of a cylindrical float with a cone superimposed, it has in FIG. 2 the form of a ball. FIG. 3 shows a further variant upon the form of the valve body 261 in the shape of a cylindrical float body 262 which upon rising of the liquid level 15 presses a sealing body 263 separated from it in space, into the edge 266 of the valve seat. In that case the sealing body 263 carries a sealing cone 246 and on the side remote from the valve seat 266 a platelike attachment 265 through which particularly easy and uniform opening and closing of the valve is possible. By this attachment 265 the sealing body 263 is with movement of the float body 262 always held in a self-centering position with respect to the valve seat 266. In the bottom region of the hollow container 20 opposite to the cover 22 the channel which can be closed from below by the inlet valve 26 is formed as a tapered socket 27 widening upwards, which is lined with a resilient seal 33.

A filling device 3 which can be introduced into the hollow container consists of a storage container 36 and a filling tube 31 which exhibits an outlet opening 32. This outlet opening 32 is tapered and enters into operative connection with the seal 33. The outlet opening 32 furthermore comprises an outlet valve 34 which is formed essentially of a spherical valve body 35 and a conical outlet valve seal 351. Naturally the valve body 35 may also have any other suitable geometrical shape so long as it guarantees easy opening and closing of the outlet valve 34.

In the region of the tapered socket 27 on the stopper 2 a fixed stud or needle-like projecting opening element 28 is provided, which as may be seen from FIGS. 1 and 2 upon introduction of the filling tube 31 into the hollow body 20 deeply enough until it reaches the seal 33, raises the valve body 35 and hence opens the outlet valve 34. The path for the admission of distilled water from the storage container 36 is thereby opened. This admission occurs until the liquid level 15 in the acid cell 11 has risen so far that the previously opened valve 26 is closed again by upwards movement of the valve body 261. On or respectively in the stopper 2 a labyrinth device 4 is provided in known manner, which for the sake of simplicity is shown only in FIG. 1 and allows for the venting of the battery interior.

Although in the drawings in each case only one individual battery element is shown, the possibility offered by the invention is recognizable, of filling by the filling system a number of acid cells 11 at the same time, or if the occasion arises, all the acid cells of a large battery group. For this purpose a corresponding number of filling devices 3 are arranged above the battery group so that they can be lowered. Each storage container 36 has a volume corresponding with the average amount of fill of the individual batteries. Before lowering this collective filling device onto the battery group all the storage containers are filled via a central pipe. If the storage containers now consist of transparent material one is in the position to observe the topping-up volume exactly and from it if necessary to draw conclusions about defective battery elements.

I claim:

1. A secondary battery filling system comprising a stopper insertible in a vertical position in an opening in the top wall of a battery and having a top filling opening communicating with a liquid channel extending vertically through said stopper, self-closing closure means for covering over said top filling opening and providing a lid above said liquid channel, a valve cage depending from the lower end of said stopper in communication with the bottom of said liquid channel and sized to extend into the interior of said battery to below the normal liquid level therein, an inlet valve comprising a float member mounted within said valve cage for sealing off the bottom end of said liquid channel against passage of liquid therethrough into the interior of said battery, said inlet valve being arranged to close off said liquid channel in use by the level of liquid in said battery; a separate portable filling device comprising a closed storage container for the filling liquid and having an elongated tubular filling nozzle extending therefrom and having an outlet opening, said nozzle being movable with respect to said stopper and sized for insertion through said self-closing closure means of said stopper with said closed storage container in inverted position and with the said nozzle extending an appreciable distance into said liquid channel; an outlet gravity biased valve mounted within said tubular nozzle and positioned to seat within and close off said outlet opening when said storage container is inverted; and an opening element fixedly mounted in the path of insertion of said filling nozzle and within the path of flow of liquid through said liquid channel, said opening element being sized and positioned to project loosely through said outlet opening and engage said outlet gravity biased valve for raising the latter inwardly within said tubular nozzle when said nozzle is inserted into said stopper.

2. A system according to claim 1, wherein said said self-closing closure means comprises a cover adapted to be opened by insertion of said nozzle and adapted to be closed automatically upon withdrawal of said nozzle.

3. A system according to claim 1, wherein a tapered socket is provided in said stopper for coupling with said filling nozzle.

4. A system according to claim 1, wherein said opening element is provided in a hollow container part of said stopper in the form of an element projecting towards said filling opening.

5. A system according to claim 1, wherein said filling nozzle is movable together with said storage container.

6. A system according to claim 5, wherein said filling nozzle and said storage container form one unit.

7. A system according to claim 5, wherein the volume of said storage container corresponds with the amount of liquid consumed by said battery.

8. A system according to claim 7, wherein said container is such that the level of liquid therein is visible from outside.

9. A stopper which is adapted to be removably inserted in an opening in the top wall of a secondary battery with said stopper extending vertically therein, and having an upper portion projecting above the top wall of said battery and a lower portion depending into the interior of said battery to below the normal liquid level therein, said upper portion having a top filling opening communicating with a liquid channel extending vertically through said stopper, an inlet valve associated with said liquid channel for opening and closing said liquid channel and adapted to be controlled by the level of liquid in said battery, said inlet valve comprising a valve seat at the lower end of said liquid channel, a float valve member, and guide means formed in said lower portion of said stopper for receiving and guiding the float member therein for vertical movement toward and away from said valve seat, and means defining a self-closing closure for said top filling opening comprising a slit rubber plate, whereby in use an elongated filling nozzle can be inserted through the self-closing closure of said filling opening and then into said liquid channel through at least a major extent of said upper portion of said stopper.

10. A stopper according to claim 9, wherein said closure is adapted to be forced by said nozzle into said stopper.

11. A stopper according to claim 9 in which said guide means comprises a valve cage in which said float valve member of said inlet valve is guided.

12. A stopper according to claim 11 wherein said valve cage is sized to extend down to below the normal level of the liquid in said battery.

13. A stopper according to claim 11, wherein said float valve member is formed as a sealing cone attached to a float cylinder.

14. A stopper according to claim 11, wherein said float valve member is made of two parts and consists of a float body and a separate sealing body.

15. A stopper according to claim 14, wherein said sealing body is provided with a plate-like attachment at the side of the valve opening remote from said valve seat with which said sealing body operates.

16. A stopper according to claim 11, wherein said float valve member consists of a ball.

17. A stopper according to claim 9, wherein said stopper has means defining a tapered socket therein for coupling with said filling nozzle.

18. A stopper according to claim 17, wherein said tapered socket is provided with a flexible seal for sealing with said nozzle.

19. A stopper according to claim 9, wherein an opening element, for use in opening an outlet valve of said nozzle when said nozzle is inserted into said stopper, is provided within said stopper in the form of a thin elongated element projecting towards said filling opening.

20. A stopper according to claim 19, wherein said stopper includes means defining a tapered socket therein for coupling with said filling nozzle, and said projecting element is positioned adjacent to said tapered socket.

* * * * *